(12) United States Patent
Holiviers

(10) Patent No.: US 6,978,871 B2
(45) Date of Patent: Dec. 27, 2005

(54) ADJUSTABLE DAMPER WITH CONTROL VALVE, MOUNTED IN AN EXTERNAL COLLAR

(75) Inventor: David Holiviers, Linler (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 10/666,196

(22) Filed: Sep. 17, 2003

(65) Prior Publication Data
US 2005/0056504 A1 Mar. 17, 2005

(51) Int. Cl.7 ................................................. F16F 9/34
(52) U.S. Cl. ............... 188/266.6; 188/318; 188/322.13
(58) Field of Search .......................... 188/266.6, 322.2, 188/322.19, 315, 318, 299.1, 322.13

(56) References Cited

U.S. PATENT DOCUMENTS

| | | | |
|---|---|---|---|
| 5,472,070 A | * 12/1995 | Feigel | 188/266.6 |
| 5,603,392 A | * 2/1997 | Beck | 188/266.6 |
| 5,730,261 A | * 3/1998 | Spakowski et al. | 188/266.6 |
| 6,079,526 A | * 6/2000 | Nezu et al. | 188/266.6 |
| 6,182,805 B1 | * 2/2001 | Kashiwagi et al. | 188/266.6 |
| 6,464,048 B1 | * 10/2002 | Groves et al. | 188/266.6 |

* cited by examiner

Primary Examiner—Xuan Lan Nguyen
(74) Attorney, Agent, or Firm—Harness, Dickey & Pierce, PLC

(57) ABSTRACT

A shock absorber according to the present invention includes a pressure tube having a working chamber disposed therewithin. A piston is slidably disposed within the working chamber and divides the working chamber into an upper working chamber and a lower working chamber. An intermediate tube is disposed around the pressure tube and the working chamber to define an intermediate chamber. A reserve tube is disposed around the intermediate tube. A collar is attached to the intermediate tube. The collar is defined by a shoulder portion extending generally lateral to the intermediate tube and a radial neck portion extending generally perpendicularly to the intermediate tube. An external control valve includes a valve seat received within the collar in an installed position. The external control valve is attached to the reserve tube.

20 Claims, 3 Drawing Sheets

US 6,978,871 B2

ADJUSTABLE DAMPER WITH CONTROL VALVE, MOUNTED IN AN EXTERNAL COLLAR

FIELD OF THE INVENTION

The present invention relates to a hydraulic damper or shock absorber adapted for use in a suspension system such as the suspension systems used for automotive vehicles. More particularly, the present invention relates to a shock absorber having an external control valve mounted in an external collar of the shock absorber.

BACKGROUND OF THE INVENTION

A conventional hydraulic damper or shock absorber comprises a cylinder which is adapted at one end for attachment to the sprung or unsprung mass of a vehicle. A piston is slidably disposed within the cylinder with the piston separating the interior of the cylinder into two fluid chambers. A piston rod is connected to the piston and extends out of one end of the cylinder where it is adapted for attachment to the other of the sprung or unsprung mass of the vehicle. A first valving system is incorporated within the piston as a safety hydraulic relief valve during the shock absorber's extension stroke of the piston with respect to the cylinder and a second valving system is incorporated within the piston for allowing fluid replenishment above the piston during the shock absorber's compression stroke of the piston with respect to the cylinder.

Various types of adjustment mechanisms have been developed to generate damping forces in relation to the speed and/or amplitude of the displacement of the sprung or unsprung mass. Often, the damping characteristics are a function of an externally mounted control valve. An externally mounted control valve is advantageous in that it may be easily removed for service or replacement. However, often it is difficult or awkward to effectively locate the respective inlet and outlet of the externally mounted control valve onto the outer housing of the shock absorber during assembly on a repeatable basis.

SUMMARY OF THE INVENTION

A shock absorber according to the present invention includes a pressure tube having a working chamber disposed therewithin. A piston is slidably disposed within the working chamber and divides the working chamber into an upper working chamber and a lower working chamber. A reserve tube surrounds the pressure tube to define a fluid reservoir. An intermediate tube is disposed between the reserve tube and the pressure tube to define an intermediate chamber. A collar is attached to the intermediate tube. An external control valve includes a valve seat received within the collar in an installed position.

In other features, the collar is further defined by a shoulder portion extending generally lateral to the intermediate tube and a radial neck portion extending generally perpendicularly to the intermediate tube. The neck portion defines an inner diameter. The valve seat defines an outer diameter, the outer diameter forming a sliding fit with the inner diameter of the neck in the installed position with a seal disposed between the collar and the valve seat. The collar is welded onto the intermediate tube such that the inner diameter of the neck aligns with a passage on the intermediate tube. The external control valve includes an inlet in fluid communication with the upper working chamber and the lower working chamber through the intermediate chamber. The external control valve includes an outlet in fluid communication with the lower working chamber through the reserve chamber.

A method of making a shock absorber includes providing a reserve tube defining a reserve chamber. An intermediate tube is provided defining an intermediate chamber and having a passage incorporated on an outer wall thereof. The intermediate tube is disposed within the reserve tube and a pressure tube is arranged within the intermediate tube having a working chamber therein. A collar is attached to the intermediate tube and extends generally perpendicularly to the intermediate tube. A valve seat of the external control valve is slidably inserted into the collar. The external control valve is attached to the reserve tube.

In other features, attaching a collar includes aligning an inner diameter of the collar with the passage incorporated on the intermediate chamber creating a fluid pathway therebetween. The collar is welded onto the intermediate tube. An output of the external control valve is aligned with a passage incorporated on the reserve chamber for providing fluid communication between the control valve and the reserve chamber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
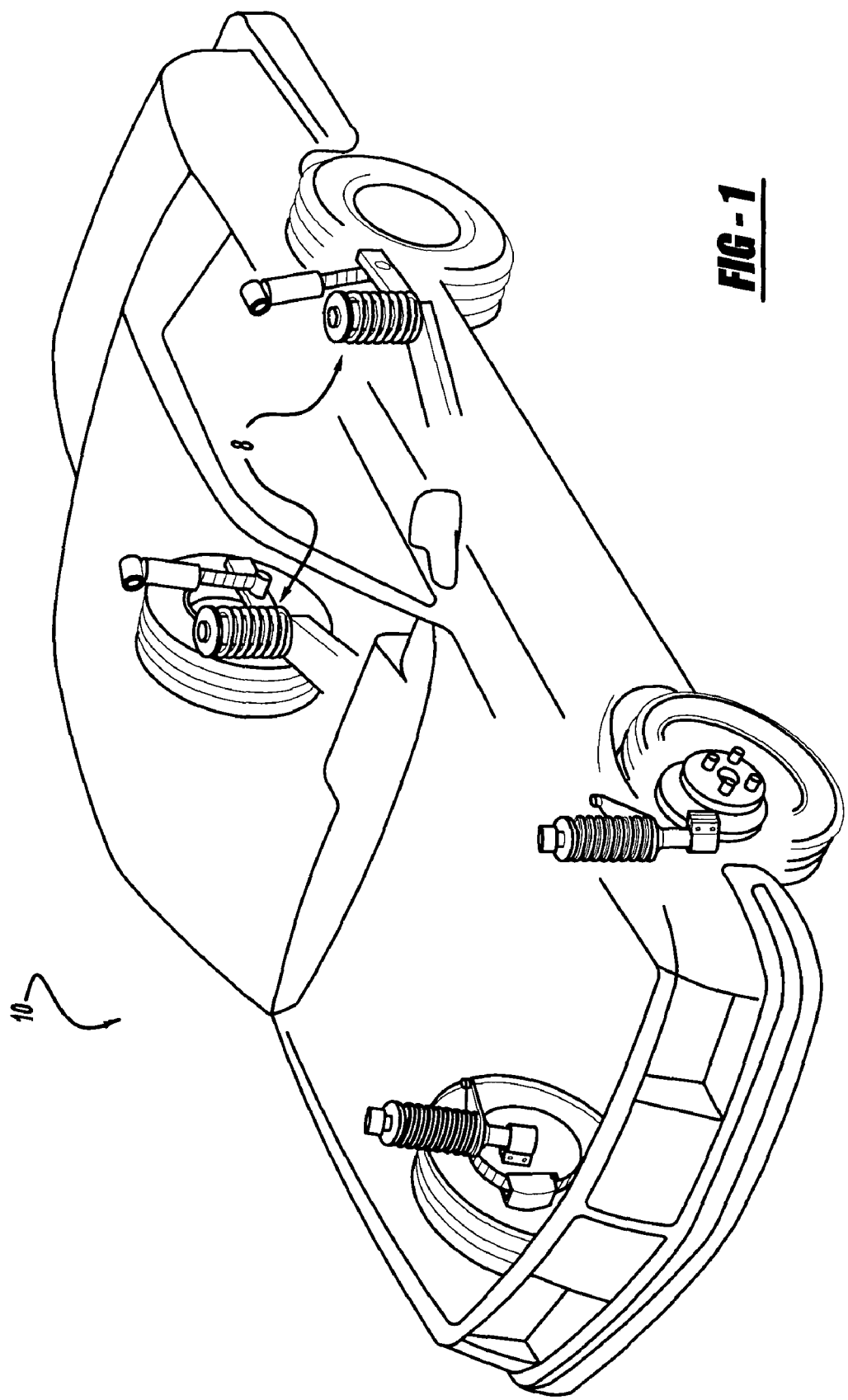
FIG. 1 is an environmental view of a shock absorber according to the present invention shown installed into a motor vehicle.
Figure 2:
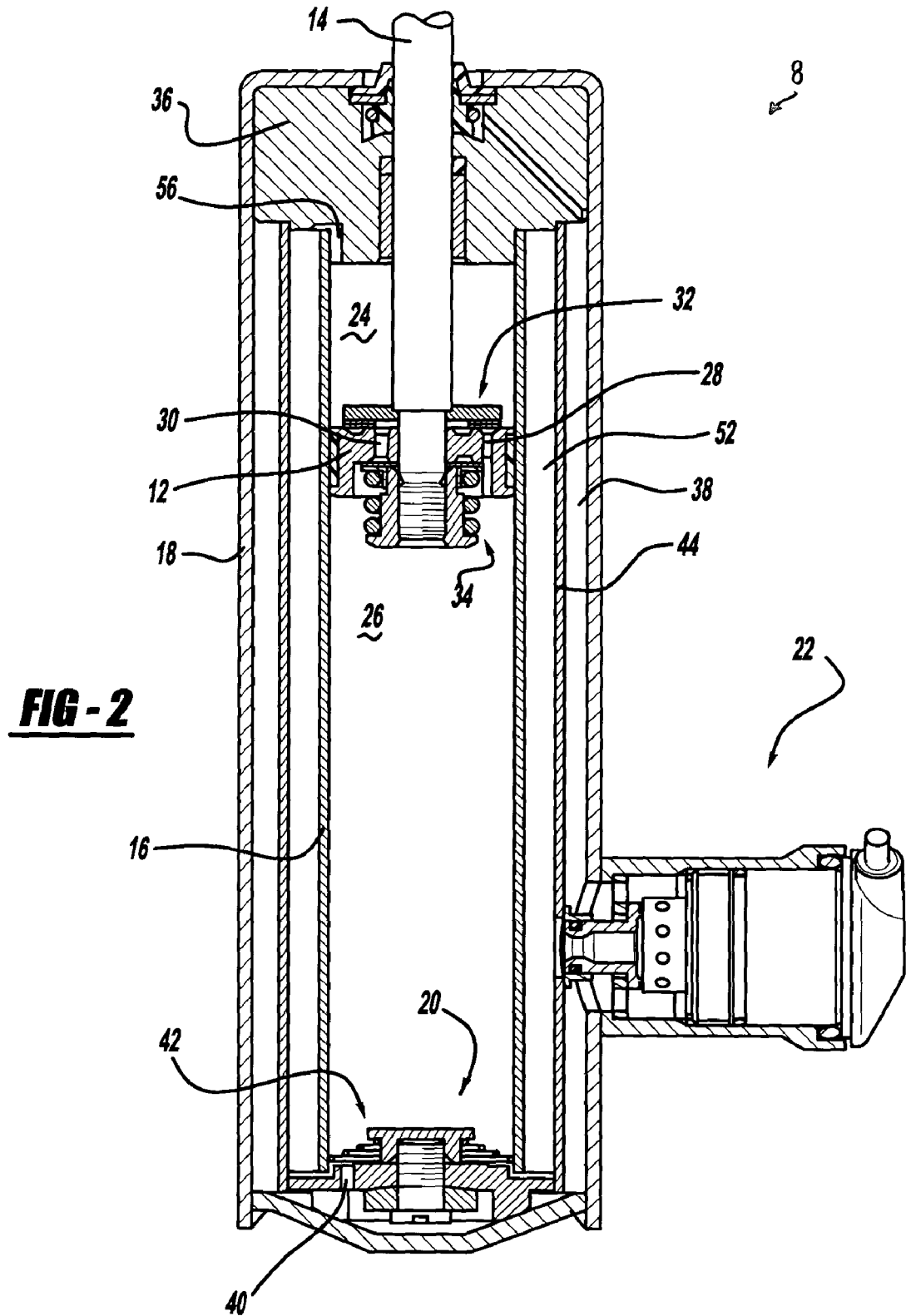
FIG. 2 is a cross-sectional side view of the shock absorber of FIG. 1.

Referring now to the drawings in which like reference numerals designate like components throughout the several views, there is shown in FIG. 1 a shock absorber according to the teachings of the present invention which is designated generally by the reference numeral 8. The shock absorber 8 is shown in a mounted position in a vehicle 10. While shock absorber 8 is illustrated as being mounted to the rear suspension of vehicle 10, it is within the scope of the present invention to utilize the features of shock absorber 8 on the front suspension of vehicle 10 if desired. Referring to FIG. 2, the shock absorber 8 is a triple tube shock absorber which comprises a piston 12, a piston rod 14, a pressure tube 16, a reserve tube or outer housing 18, a base valve assembly 20 and an externally mounted control valve 22. The externally mounted control valve 22 is mounted in a transverse relationship with the reserve tube 18.

The piston 12 is slidingly received within the pressure tube 16 and divides the pressure tube 16 into an upper working chamber 24 and a lower working chamber 26. The piston 12 defines a plurality of compression passages 28 and a plurality of rebound passages 30, each of which extends between the upper and lower working chambers 24 and 26. A compression check valve 32 allows fluid flow from the lower working chamber 26 through the passages 28 to the upper working chamber 24 during a compression stroke of the shock absorber 10, but prohibits fluid flow from the upper working chamber 24 to the lower working chamber 26 during a rebound stroke of the shock absorber 10.

A rebound check valve 34 allows fluid flow from the upper working chamber 24 through the passages 30 to the lower working chamber 26 during a rebound stroke of the shock absorber 10 but prohibits fluid flow from the lower working chamber 26 to the upper working chamber 24 during a compression stroke of the shock absorber 10. The compression check valve 32 and the rebound check valve 34 do not determine the damping force characteristics for the shock absorber 10. The compression check valve 32 is for the replenishment of damping fluid only and the rebound check valve 34 is a blow-off valve set for preventing damage to the components of the shock absorber 8 in case of excess fluid pressure during a compression stroke of the shock absorber 8.

The piston rod 14 is attached to the piston 12 and extends out of the pressure tube 16 and reserve tube 18 through a rod guide 36. The outer end of the piston rod 14 is adapted to be attached to the sprung mass of the vehicle by means well known in the art. The reserve tube 18 surrounds the pressure tube 16 and with the pressure tube 16 defines a reserve chamber 38. The reserve tube 18 is adapted for attachment to the unsprung mass of the vehicle by methods well known in the art. The base valve assembly 20 is disposed between the lower working chamber 26 and the reserve chamber 38 and it defines a plurality of passages 40 for permitting fluid flow between these chambers. A one-way check valve 42 allows fluid flow from the reserve chamber 38 to the lower working chamber 26 through the passages 40 but prohibits fluid flow from the lower working chamber 26 to the reserve chamber 38.

An intermediate tube 44 sealingly engages the rod guide 36 on an upper end and engages the base valve assembly 20 on a lower end. An intermediate chamber 52 is defined between the intermediate tube 44 and the pressure tube 16. A passage 56 is formed in the rod guide 36 for fluidly connecting the upper working chamber 24 and the intermediate chamber 52.

Figure 3:
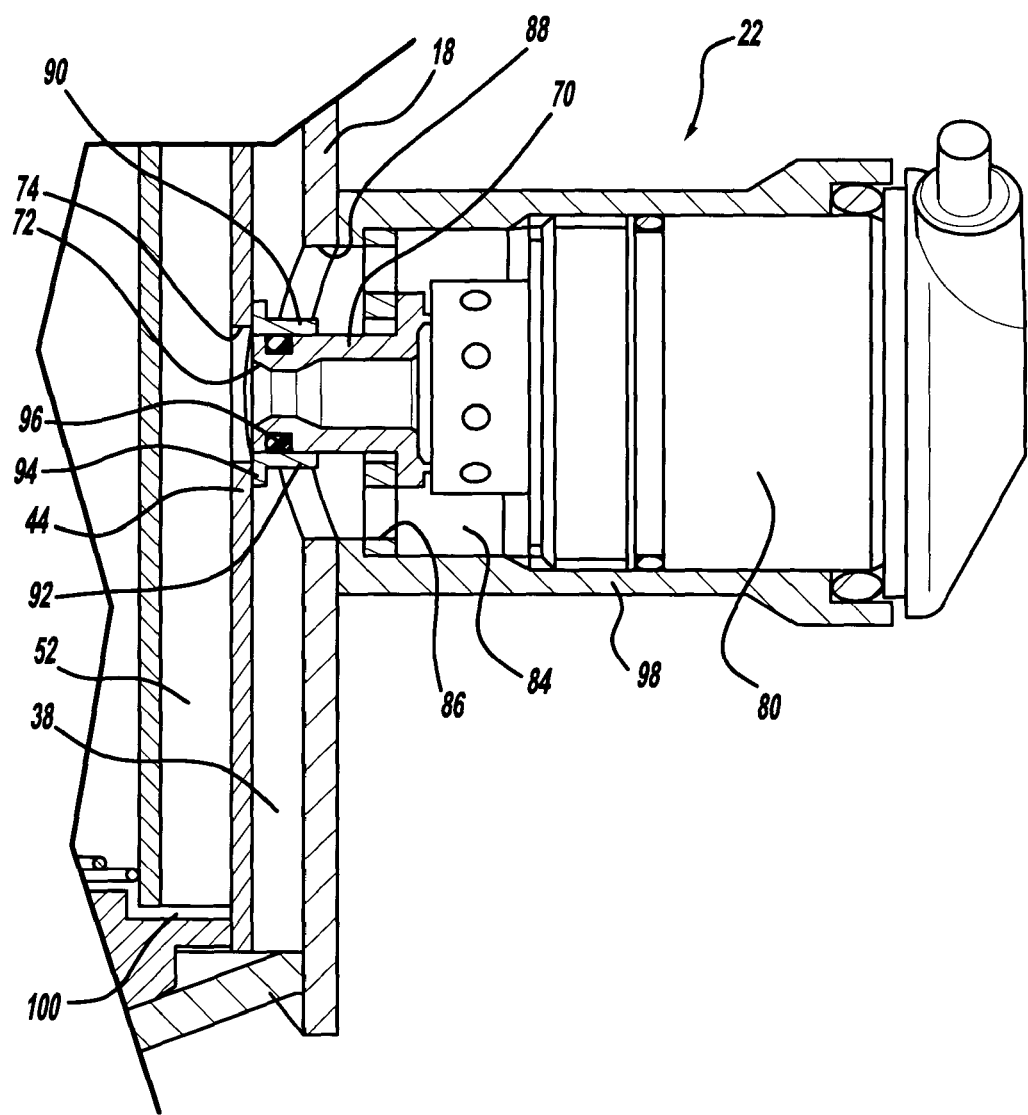
FIG. 3 is a cross-sectional side view of the externally mounted control valve according to the present invention.

With continued reference to FIG. 2 and further reference to FIG. 3, the control valve assembly 22 will be described in greater detail. The control valve assembly 22 includes a valve seat 70 having an inlet passage 72 aligned with a passage 74 on the intermediate tube 44 for fluid communication with the intermediate chamber 52. Fluid is delivered to a control valve 80 from the valve seat 70. Fluid exits the control valve 80 at the control valve outlet 84 and is delivered to the reserve chamber 38 through a valve seat plate 86 and passage 88 in the reserve tube 18. As shown in FIG. 3, the valve seat 70 is axially received within a collar 90 mounted on the intermediate tube 44. The collar 90 generally includes a radial neck portion 92 transversely extending with respect to the intermediate tube 44 and a shoulder portion 94 extending laterally to the intermediate tube 44. The neck portion 92 of the collar 90 has an inner diameter sufficient to accept the outer diameter of the valve seat 70 in an installed position. An O-ring 96 is disposed around a radial cavity on the valve seat 70 and contacts the collar 90 to form an interference fit between the valve seat 70 and collar 90 and a seat threat.

The collar 90 is preferably a distinct piece from the intermediate tube 44 and is mounted onto the intermediate tube 44 by suitable fastening techniques such as welding. As is presently preferred, the external control valve assembly 22 includes a housing 98 that is welded to the outer cylindrical surface of the reserve tube 18. It is appreciated however that other attachment techniques may similarly be employed for coupling the control valve assembly 22 to the reserve tube 18.

With continued reference to FIGS. 2 and 3, the operation of the shock absorber 8 will be described. During a rebound stroke, the check valve 32 in the piston 12 is closed preventing fluid flow between the upper working chamber 24 and the lower working chamber 26. The check valve 34 prohibits fluid flow also due to its setting as described above. Fluid is forced through the passage 56 formed in the rod guide 36. The fluid enters the intermediate chamber 52 which is concentric with the working chambers 24 and 26 and is directed to inlet passage 72 and lower working chamber 26 through a passage 100. Fluid enters through the inlet passage 72 of the control valve assembly 22. After entering the inlet passage 72, fluid flows through the valve seat 70 and into the control valve 80. From the control valve 80, the fluid flows to the control valve outlet 84 and valve seat plate 86. Fluid then enters the reserve chamber 38 through passage 88.

The damping characteristics of the shock absorber 8 are determined by the configuration of the control valve 80. As such, the control valve 80 may be configured to provide a predetermined damping function corresponding from a firm ride to a soft ride. Alternatively, the control valve 80 may provide a variable damping function such as one adaptable to road conditions or driver input for example. Fluid flowing from the control valve 80 is directed through the control valve outlet 84 and to the reserve chamber 38 through the outlet passage 88. The rebound movement of the piston 12 creates a low pressure within the lower working chamber 26. The one way check valve 42 in the base valve assembly 20 will open to allow fluid flow from the reserve chamber 38 to the lower working chamber 26.

During the compression stroke, the check valve 42 in the base assembly 20 is closed preventing fluid flow between the lower working chamber 26 and the reserve chamber 38. Fluid is forced through passage 100 formed in the base valve assembly 20 and enters the intermediate chamber 52 and is directed to the inlet passage 72 and upper working chamber 26 through passage 56. From the intermediate chamber 52, fluid enters through the inlet passage 72 of the control valve assembly 22. After entering the inlet passage 72, fluid flows through the valve seat 70 and into the control valve 80. From the control valve 80, the fluid flows to the control valve outlet 84 and valve seat plate 86. Fluid then enters the reserve chamber 38 through passage 88. Again, the damping characteristics are realized through the control valve 80. The one-way check valve 32 in the piston 12 will open and allow fluid flow between the lower working chamber 26 and the upper working chamber 24. Thus as can be seen from FIG. 2 and 3 and the above description, intermediate chamber 52 is in direct fluid communication with both upper and lower working chambers 24 and 26 and fluid flow directly between these chambers occurs through intermediate chamber 52.

A method for attaching the external control valve assembly 22 to the reserve tube 18 according to the present invention will be described in greater detail. A reserve tube 18 defining a reserve chamber 38 is provided. An intermediate tube 44 defining an intermediate chamber 52 and having a passage 74 incorporated on a cylindrical outer wall thereof is provided. The intermediate tube 44 is disposed within the reserve tube 18 and a pressure tube 16 is arranged within the intermediate tube 44 having a working chamber therein. The housing 98 of the external control valve 22 is placed flush onto the reserve tube 18. While placing the respective reserve tube 18 and housing 98 into a contacting relationship, the valve seat 70 of the control valve assembly 22 is located into the inner diameter of the shoulder 92 of the collar 90. The shoulders 92 of the collar 90 provide a guide for the valve seat 70 to be slidingly received.

A fluid communication pathway is created at the inlet passage 72 of the external control valve 22 and the passage 74 of the reserve tube 18. In this way a fluid communication pathway is created from the intermediate chamber 52 to the control valve 80. Concurrently, the passage 88 incorporated in the reserve tube 18 is aligned with the valve seat plate 86 thereby providing a fluid communication pathway from the control valve 80 to the reserve chamber 38. The reserve tube 18 and housing 98 are coupled together by a weld joint or other suitable method.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A shock absorber comprising:
   a pressure tube having a working chamber disposed therewithin;
   a piston slidably disposed within said working chamber and dividing said working chamber into an upper working chamber and a lower working chamber;
   a reserve tube surrounding said pressure tube to define a reserve chamber;
   an intermediate tube disposed between said reserve tube and said pressure tube to define an intermediate chamber, said intermediate chamber being in direct communication with both said upper and lower working chambers, said upper and lower working chambers being in direct communication with each other through said intermediate chamber;
   a collar attached to said intermediate tube; and
   an external control valve having a valve seat received within said collar in an installed position.

2. The shock absorber of claim 1 wherein said collar is further defined by a shoulder portion extending generally lateral to said intermediate tube and a radial neck portion extending generally perpendicular to said intermediate tube, said neck portion defining an inner diameter.

3. The shock absorber of claim 2 wherein said valve seat defines an outer diameter, said outer diameter forming a slip fit with said inner diameter of said neck in said installed position.

4. The shock absorber of claim 3 further comprising a seal disposed between said valve seat and said collar.

5. The shock absorber of claim 2 wherein said collar is welded onto said intermediate tube such that the inner diameter of said neck aligns with a passage on said intermediate tube.

6. The shock absorber of claim 1 wherein said external control valve includes an inlet in fluid communication with said upper working chamber and said lower working chamber through said intermediate chamber.

7. The shock absorber of claim 1 wherein said external control valve includes an outlet in fluid communication with said lower working chamber through said reserve chamber.

8. The shock absorber of claim 7 wherein said external control valve includes an outer housing attached to said reserve tube in an installed position, said reserve tube including a passage for providing fluid communication between said control valve and said reserve chamber.

9. The shock absorber of claim 1, further comprising an o-ring disposed around said valve seat, said o-ring providing a seal between said inner diameter of said neck and said outer diameter of said valve seat.

10. A shock absorber comprising:
    a reserve tube defining a reserve chamber;
    an intermediate tube defining an intermediate chamber and disposed within said reserve tube;
    a pressure tube arranged within said intermediate tube and having a working chamber therein;
    a piston disposed within said pressure tube, said piston dividing said working chamber into an upper working chamber and a lower working chamber, said intermediate chamber being in direct communication with both said upper and lower working chambers, said upper and lower working chambers being in direct communication with each other through said intermediate chamber;
    a collar attached to said intermediate tube; and
    an external control valve attached to said reserve tube and received within said collar in an installed position.

11. The shock absorber of claim 10 wherein said collar is further defined by a shoulder portion extending generally lateral to said intermediate tube and a radial neck portion extending generally perpendicularly to said intermediate tube, said neck portion defining an inner diameter.

12. The shock absorber of claim 11 wherein said external control valve includes a valve seat defining an outer diameter, said outer diameter forming a slip fit with said inner diameter of said neck in said installed position.

13. The shock absorber of claim 12 further comprising a seal disposed between said valve seat and said collar.

14. The shock absorber of claim 11 wherein said collar is welded onto said intermediate tube such that the inner diameter of said neck aligns with a passage on said intermediate tube.

15. The shock absorber of claim 10 wherein said external control valve includes an outer housing attached to said reserve tube in an installed position, said reserve tube including a passage for providing fluid communication between said control valve and said reserve chamber.

16. A method of making a shock absorber comprising:
    providing a reserve tube defining a reserve chamber, an intermediate tube defining an intermediate chamber and having a passage incorporated on an outer wall thereof, said intermediate tube disposed within said reserve tube and a pressure tube arranged within said intermediate tube and having a working chamber therein;
    providing a piston disposed within said pressure tube to divide said working chamber into an upper working chamber and a lower working chamber, said intermediate chamber being in direct communication with both said upper and lower working chambers, said upper and lower working chambers being in direct communication with each other through said intermediate chamber;

attaching a collar to said intermediate tube, said collar extending generally perpendicularly to said intermediate tube;

slidably inserting a valve seat of an external control valve into said collar; and attaching said external control valve to said reserve tube.

17. The method of claim 16 wherein attaching a collar includes aligning an inner diameter of said collar with said passage incorporated on said intermediate chamber creating a fluid pathway therebetween.

18. The method of claim 17 wherein attaching a collar includes welding said collar to said intermediate tube.

19. The method of claim 16 wherein slidably inserting a valve seat further includes aligning an output of said external control valve with a passage incorporated on said reserve chamber for providing fluid communication between said external control valve and said reserve chamber.

20. The method of claim 16 wherein attaching said external control valve includes welding an outer housing of said external control valve to said reserve tube.

* * * * *